(12) United States Patent
Alexander et al.

(10) Patent No.: US 8,253,063 B2
(45) Date of Patent: Aug. 28, 2012

(54) METHOD FOR MAKING A SOLENOID ACTUATOR

(75) Inventors: Dan Alexander, Schaumburg, IL (US);
Aditya Ashok Parikh, Prospect Heights, IL (US); Kevin Cassaidy, Mt. Prospect, IL (US); Jaklin Yoesep, Arlington Heights, IL (US)

(73) Assignee: HydraForce, Inc., Lincolnshire, IL (US)

( * ) Notice: Subject to any disclaimer, the term of this patent is extended or adjusted under 35 U.S.C. 154(b) by 614 days.

(21) Appl. No.: 12/509,256

(22) Filed: Jul. 24, 2009

(65) Prior Publication Data

US 2010/0024200 A1 Feb. 4, 2010

Related U.S. Application Data

(60) Provisional application No. 61/084,763, filed on Jul. 30, 2008.

(51) Int. Cl.
*H01F 7/06* (2006.01)
*B23K 26/34* (2006.01)
*B23K 101/04* (2006.01)

(52) U.S. Cl. ......... 219/121.64; 219/121.66; 251/129.15

(58) Field of Classification Search ............. 219/121.64, 219/121.66; 251/129.15; 239/585.1; 228/165, 228/189; 29/602.1, 890.124, 890.128, 890.129, 29/890.131, 890.132; 335/281
See application file for complete search history.

(56) References Cited

U.S. PATENT DOCUMENTS

| | | | |
|---|---|---|---|
| 4,300,474 A | 11/1981 | Livsey | |
| 4,315,132 A | 2/1982 | Saurin et al. | |
| 5,038,014 A | 8/1991 | Pratt et al. | |
| 5,050,840 A * | 9/1991 | Kondo et al. | ............ 251/129.15 |
| 5,538,220 A | 7/1996 | LaMarca | |
| 5,575,309 A | 11/1996 | Connell | |
| 5,837,960 A | 11/1998 | Lewis et al. | |
| 6,065,495 A | 5/2000 | Fong et al. | |
| 6,206,343 B1 | 3/2001 | Kato et al. | |
| 6,269,540 B1 | 8/2001 | Islam et al. | |
| 6,534,745 B1 | 3/2003 | Lowney | |
| 6,751,847 B1 | 6/2004 | Brey et al. | |
| 6,752,374 B2 | 6/2004 | Miyamoto et al. | |
| 7,014,168 B2 | 3/2006 | Shimura et al. | |
| 7,600,666 B2 * | 10/2009 | Rabinovich | ................... 228/125 |
| 2005/0012062 A1 | 1/2005 | Hayashi | |
| 2005/0166979 A1 | 8/2005 | Berger et al. | |
| 2005/0279957 A1 | 12/2005 | Inami et al. | |
| 2006/0236765 A1 * | 10/2006 | Bouet et al. | ..................... 73/577 |
| 2009/0002109 A1 * | 1/2009 | Stitz | ............................. 335/281 |

* cited by examiner

*Primary Examiner* — Samuel M Heinrich
(74) *Attorney, Agent, or Firm* — Leydig, Voit & Mayer, Ltd.

(57) ABSTRACT

A method of making a solenoid actuator by laser direct metal deposition can comprise heating with a laser an outer surface of a circumferential groove of a solenoid tube blank constructed of a first material to create a heated area and depositing a second material upon the heated area to form a layer of second material. The second material can melt and then cool to thereby bond to the solenoid tube blank. A bore can be defined in the solenoid tube blank such that the bore includes an interior surface having a ring of second material disposed between a pair of portions of first material.

20 Claims, 4 Drawing Sheets

METHOD FOR MAKING A SOLENOID ACTUATOR

CROSS-REFERENCE TO RELATED APPLICATIONS

This patent application claims the benefit of priority to U.S. Provisional Patent Application No. 61/084,763, filed Jul. 30, 2008, and entitled "Method For Making A Solenoid Actuator," which is incorporated in its entirety herein by this reference.

FIELD OF THE INVENTION

The present invention relates generally to a method for making solenoid actuators and, more particularly, to a method for making solenoid actuators including a tube made from a magnetic portion and a non-magnetic portion.

BACKGROUND OF THE INVENTION

A solenoid actuator generally has a cylinder portion including a tube made from a magnetic material and a ring of nonmagnetic material disposed along the length of the tube. Performance characteristics, including the force and the stroke of the solenoid, for example, are affected by the design of the magnetic portion and the non-magnetic ring of the tube. The shape, width, and thickness of the nonmagnetic ring can help define the solenoid force and stroke characteristics, for example.

One method of making a solenoid actuator involves depositing a bronze alloy into a groove on a solenoid tube blank and bonding the materials together via tungsten inert gas (TIG) welding. The solenoid tube assembly is then machined to the designed dimensions. This process generally allows a manufacturer to produce a solenoid actuator with the intended force and stroke characteristics; however, significant problems with this process exist.

Solenoid actuators are exposed to internal pressures. The materials used to form solenoid tube blanks, usually steel, and the materials used to form the nonmagnetic ring, usually a bronze alloy, can have different moduli of elasticity. This causes the two materials to behave differently when exposed to internal pressure and often causes high stress areas where the two materials bond, thereby increasing the risk of failure when exposed to internal pressure.

Using TIG welding to bond the ring to the solenoid tube blank can cause large voids in the bronze alloy, which can reduce strength. Occasionally, the bronze alloy fails to bond sufficiently to the steel solenoid tube blank. When using the TIG welding process, a great deal of heat is applied to solenoid tube blank which can cause warping and affect the shape and performance of the final solenoid actuator.

BRIEF SUMMARY OF THE INVENTION

In accordance with the principles of the disclosure, a method of making a solenoid actuator can include beginning with a solenoid tube blank which can be constructed of a first material and has a circumferential groove. A laser can be directed at the circumferential groove of the solenoid tube blank which creates a heated area. A dispenser can be used to deposit an amount of second material upon the heated area which causes the second material to melt and form a layer of second material. Once the second material has been melted, it can be allowed to cool which creates a bond between the layer of second material and the solenoid tube blank. Material can be removed from the inside of the solenoid tube blank which creates a bore with an interior surface which has a ring of second material disposed between a pair of portions of first material.

In another embodiment, a method of making a solenoid actuator can include beginning with a solenoid tube blank which can be constructed of a first material and has a circumferential groove. A laser can be directed at the circumferential groove of the solenoid tube blank which creates a heated area. A dispenser can be used to deposit an amount of second material upon the heated area which causes the second material to melt and form a layer of second material. Once the second material has been melted, it can be allowed to cool which creates a bond between the layer of second material and the solenoid tube blank. The laser can be moved relative to the solenoid tube blank and the solenoid tube blank can be rotated relative to the laser to create a layer of second material that encircles the solenoid tube blank. Material can be removed from the inside of the solenoid tube blank which creates a bore with an interior surface which has a ring of second material disposed between a pair of portions of first material.

In another embodiment, a method of making a solenoid actuator can include beginning with a solenoid tube blank which can be constructed of a first material and has a circumferential groove. A laser can be directed at the circumferential groove of the solenoid tube blank which creates a heated area. A dispenser can be used to deposit an amount of second material upon the heated area which causes the second material to melt and form a layer of second material. Once the second material has been melted, it can be allowed to cool which creates a bond between the layer of second material and the solenoid tube blank. The laser can be moved relative to the solenoid tube blank and the solenoid tube blank can be rotated relative to the laser to create a layer of second material that encircles the solenoid tube blank. The laser can again be directed at the circumferential groove which now includes a layer of second material previously deposited in the circumferential groove, and the laser creates a heated area. The dispenser can be used to deposit upon the heated area a second material which causes the second material to melt. The heated area can then be allowed to cool which causes the layer of second material to bond to the solenoid tube blank. Material can be removed from the inside of the solenoid tube blank which creates a bore with an interior surface which has a ring of second material disposed between a pair of portions of first material.

Other features of the invention are described in, and will be apparent from the following description and the annexed drawings.

DETAILED DESCRIPTION OF EMBODIMENTS OF THE INVENTION

Figure 1:
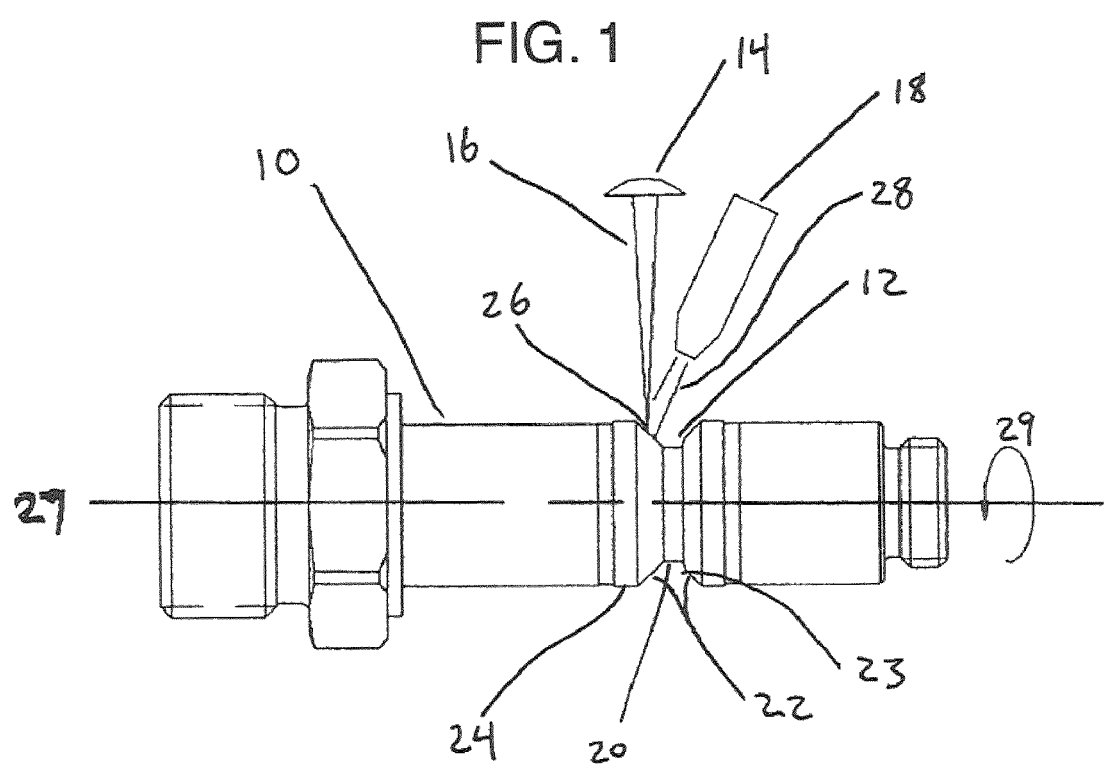
FIG. 1 is a side elevational view of a solenoid tube blank made from a magnetic material, a laser, and a dispenser suitable for use with a process for making a solenoid actuator according to the disclosure in which the laser beam heats a circumferential groove of the blank.

Turning now to the drawings, a solenoid tube blank 10 having a circumferential groove 12 is shown in FIG. 1. The solenoid tube blank 10 can be made from a magnetic material. A laser 14, which can emit a laser beam 16, can be provided to heat the groove 12 of the blank 10. A dispenser 18 can be provided to dispense a predetermined amount of a non-magnetic material into the heated groove 12.

The solenoid tube blank 10 can be constructed using a first material. The first material can be any suitable material, such as a magnetic material. In some embodiments, the first material comprises steel. The circumferential groove 12 of the solenoid tube blank 10 has an endface 20 and a pair of sides 22 extending a predetermined depth 23 between an exterior surface 24 of the blank 10 and the endface 20. The depth 23 can be any suitable depth. The sides 22 of the groove 12 can be tapered, as depicted in FIG. 1, or may be any other suitable configuration. The solenoid tube blank 10 can be solid such that it does not include an internal cavity. In other embodiments, the blank 10 can include a longitudinal bore that has a diameter less than the diameter defined by the endface 20.

As depicted in FIG. 1, the laser 14 can be controlled so that the laser beam 16 is directed at the groove 12 of the solenoid tube blank 10. The laser beam 16 can heat a portion of the solenoid tube blank 10, thereby forming a heated area 26 into which the dispenser 18 dispenses a second material 28. In some embodiments, the heated area can be molten. The heating step can be performed without substantially changing the shape of the circumferential groove 12.

The dispenser can hold a predetermined amount of second material 28 and deposit the second material 28 upon the heated area 26. The dispenser can be configured to deposit second material 28 in any suitable form, for example a powder. The dispenser 18 can be controlled so that it is directed at the groove 12 of the solenoid tube blank 10.

The second material 28 may be any suitable material but is generally nonmagnetic, such as, stainless steel, for example. Although any suitable materials may be used, the use of steel as the first material and stainless steel as the second material can impart greater strength to the completed solenoid actuator because the two materials have similar moduli of elasticity which can reduce stress points when the tube is exposed to internal pressure. As depicted in FIG. 1, the second material 28 is in the form of a powder, but the second material 28 can be in other forms, such as, a wire or a strip, for example.

As the second material 28 is deposited upon the heated area 26, the second material 28 can be heated by at least one of the laser beam 16 and the heated area 26, thereby causing the second material 28 to melt. As the heated area 26 cools, a bond can be created between the solenoid tube blank 10 and the second material 28 wherein there can be a layer of second material on top of the groove 12 of the solenoid tube blank 10. The depositing step can be performed without substantially changing the shape of the circumferential groove 12. Apparatus suitable for use in performing the depositing step and other aspects of the depositing step can be similar to those described in U.S. Pat. No. 5,837,960, for example.

The solenoid tube blank 10 can rotate with respect to the laser 14 and the dispenser 18 about a longitudinal axis 27 of the blank 10 as indicated by an arrow 29 in FIG. 1. The laser 14 and the dispenser 18 can be movable relative to the solenoid tube blank 10 such that at least one of the laser 14 and the dispenser 18 can be relatively movable along the longitudinal axis 27 of the blank 10. Movement of at least one of the laser 14 and the dispenser 18 relative to the blank 10 can occur along an axis perpendicular to the longitudinal axis 27. In other embodiments, at least one of the laser 14 and the dispenser 18 can rotate about a predetermined axis to allow the laser beam 16 and/or the stream of second material 28 to move relative to the blank 10. Any suitable apparatus can be provided to allow the laser 14 and the dispenser 18 to move with respect to the solenoid tube blank 10.

The rotational and axial movement of the solenoid tube blank 10 relative to the laser 14 and the dispenser 18 can be performed simultaneously. The second material 28 can be deposited over the surface of the solenoid tube blank 10 within the circumferential groove 12 to create a layer of second material 28 bonded to the circumferential groove 12 of the solenoid tube blank 10 that encircles the entire solenoid tube blank 10.

The relative movement of the solenoid tube blank 10, the laser 14, and the dispenser 18 may be accomplished by any suitable means. The movement of these parts may be automatically controlled through use of a computer and/or programmable logic controller, for example.

The steps of heating the blank 10 with the laser beam 16 to create a heated area 26 and depositing a second material can be repeated such that a plurality of successive, overlaying layers of second material are created. The laser beam 16 can be directed at the underlying layer of second material and the blank 10 to create a heated area 26. The heated area 26 can include the solenoid tube blank 10, the first layer of second material, or a combination of the two. Again the second material 28 can be deposited into the heated area 26 to create a second layer of second material bonded to the first layer of second material 28 and the circumferential groove 12. The solenoid tube blank 10 can be rotated about its longitudinal axis 27 as the laser 14 and dispenser 18 move such that a second layer of second material can be created that encircles the solenoid tube blank 10.

Figure 2:
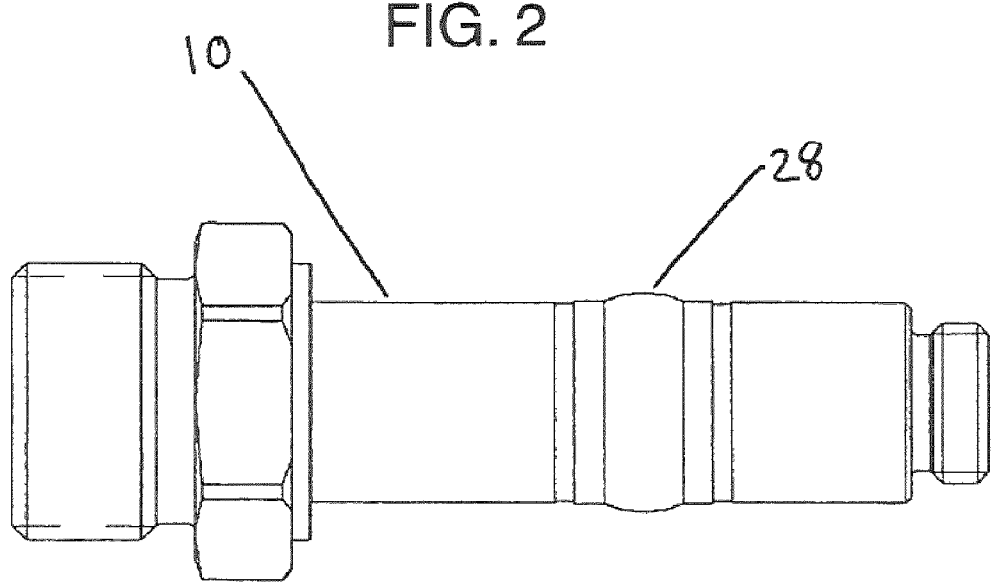
FIG. 2 is a side elevational view of the solenoid tube blank of FIG. 1 after a non-magnetic material is deposited in the groove from the dispenser.

Successive layers of second material can be deposited until the depth 23 of the circumferential groove 12 is filled with contiguous bonded layers of second material 28. In some embodiments, about ten layers of the second material 28 can be deposited to fill the groove 12. As depicted in FIG. 2, the depth 23 of the circumferential groove 12 may be over-filled with bonded layers of second material 28 which may cause a bulge extending beyond the exterior surface 24 of the blank 10.

Figure 3:
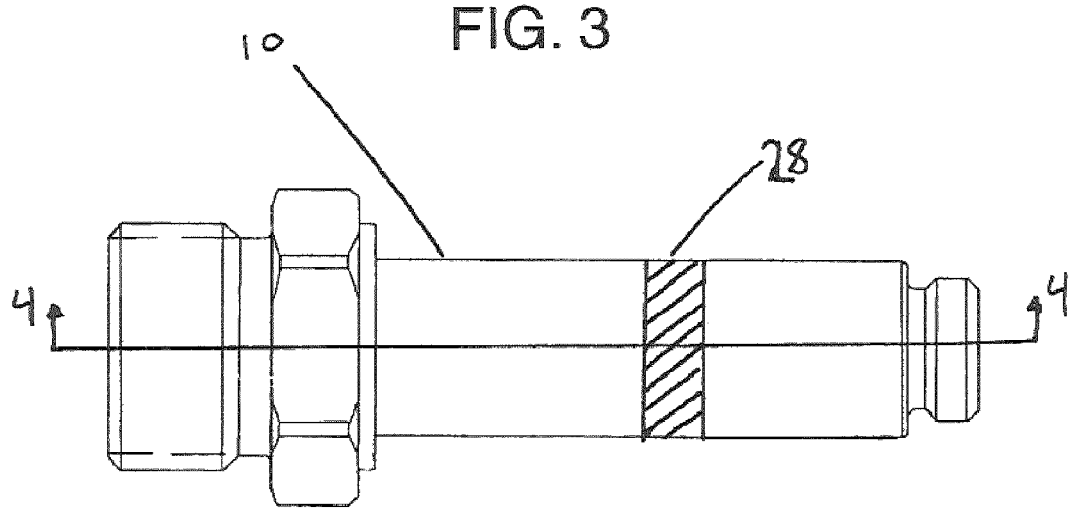
FIG. 3 is a side elevational view of the solenoid tube blank of FIG. 1 after the blank's exterior surface is machined.
Figure 4:
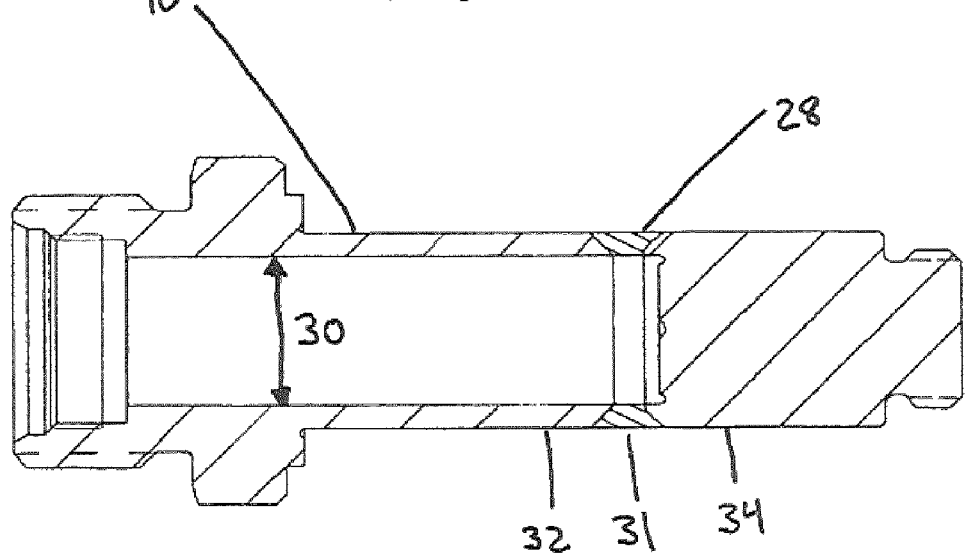
FIG. 4 is a cross-sectional view of the solenoid tube blank taken along line 4-4 in FIG. 3.

The solenoid tube blank can be machined to its final dimensions, as depicted in FIGS. 3 and 4. The machining may be done by any suitable method including milling, drilling and reaming, for example.

Referring to FIG. 3, the machining step can include reducing the overall circumference of the solenoid tube blank 12. The final dimension of the solenoid tube blank may vary depending on the requirements of the particular solenoid actuator.

Referring to FIG. 4, the machining step can include increasing the plunger bore diameter 30 of the solenoid tube blank 10 such that the bore has an interior surface with a ring 31 of the second material disposed between a first part 32 and a second part 34 of the first material. In other embodiments the blank 12 can be solid, and the machining step can include defining a plunger bore having an interior surface with a ring of second material disposed between first and second parts of the first material. The final dimensions of the plunger bore diameter 30 may vary depending on the requirements of the particular solenoid actuator.

Embodiments of the disclosed method can avoid the problems of manufacturing solenoid actuators out of two separate materials by using materials with similar moduli of elasticity such that the shape, width, and thickness of the second material can be closely defined, and such that the two materials can form a reliable bond. This can result in increased strength of the solenoid actuator, which can allow the solenoid actuator to deform more uniformly when exposed to an internal pressure which may cause fewer stress points. Because the disclosed method may increase structural strength of the solenoid actuator, the tube wall can be reduced which can allow for a larger bore or plunger diameter 30, which may result in increased solenoid actuator force.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for manufacturing a solenoid actuator comprising:
   providing a solenoid tube blank having a circumferential groove and constructed of a first material;
   heating with a laser an area of the circumferential groove to create a heated area;
   depositing a second material upon the heated area to form a layer of second material, the second material thereby melting;
   allowing the heated area and the layer of second material to cool, thereby bonding the layer of second material to the solenoid tube blank;
   defining in the solenoid tube blank a bore with an interior surface having a ring of second material disposed between a pair of portions of first material.

2. The method of claim 1, wherein the circumferential groove has a depth and the layer of second material has a thickness, the thickness of the layer of second material being less than the depth of the groove.

3. The method of claim 2, further comprising:
   heating with a laser an area of the layer of second material deposited in the circumferential groove to create a heated area;
   depositing upon the heated area a second material to form another layer of second material, the second material thereby melting;
   allowing the heated area and the layer of second material to cool, thereby bonding the layer of second material to the solenoid tube blank.

4. The method of claim 3, wherein at least two layers of second material are deposited into the circumferential groove.

5. The method of claim 1, wherein the first material, forming the solenoid tube blank, is a magnetic material.

6. The method of claim 1, wherein the first material is steel.

7. The method of claim 1, wherein the second material, deposited into the molten area, is a non-magnetic metal.

8. The method of claim 1, wherein the second material is stainless steel.

9. The method of claim 1, wherein the first material has a first modulus of elasticity and the second material has a second modulus of elasticity, the first modulus of elasticity being substantially similar to the second modulus of elasticity.

10. The method of claim 1, wherein the second material in the depositing step comprises a powder.

11. The method of claim 1, wherein the second material in the depositing step comprises a wire.

12. The method of claim 1, wherein the second material in the depositing step comprises a strip.

13. The method of claim 1, further comprising:
    moving the laser relative to the solenoid tube blank to change the point at which the laser beats the circumferential groove;
    rotating the solenoid tube blank relative to the laser such that the layer of second material encircles the solenoid tube blank.

14. The method of claim 13, wherein the movement of the laser relative to the solenoid tube blank and the rotation of the solenoid tube blank relative to the laser are automatically controlled.

15. A method for manufacturing a solenoid actuator comprising:
    providing a solenoid tube blank having a circumferential groove and constructed of a first material;
    heating with a laser an area of the circumferential groove to create a heated area;
    depositing a second material upon the heated area to form a layer of second material, the second material thereby melting;
    allowing the heated area and the layer of second material to cool, thereby bonding the layer of second material to the solenoid tube blank;
    moving the laser relative to the solenoid tube blank to change the point at which the laser heats the circumferential groove;
    rotating the solenoid tube blank relative to the laser such that the layer of second material encircles the solenoid tube blank;

defining in the solenoid tube blank a bore with an interior surface having a ring of second material disposed between a pair of portions of first material.

16. The method of claim 15, wherein the first material is magnetic.

17. The method of claim 15, wherein the second material is nonmagnetic.

18. A method for manufacturing a solenoid actuator comprising:

providing a solenoid tube blank having a circumferential groove and constructed of a first material;

heating with a laser an area of the circumferential groove to create a heated area;

depositing a second material upon the heated area to form a layer of second material, the second material thereby melting;

allowing the heated area and the layer of second material to cool, thereby bonding the layer of second material to the solenoid tube blank;

moving the laser relative to the solenoid tube blank to change the point at which the laser heats the circumferential groove;

rotating the solenoid tube blank relative to the laser such that the layer of second material encircles the solenoid tube blank;

heating with a laser an area of the layer of second material deposited in the circumferential groove to create a heated area;

depositing upon the heated area a second material to form another layer of second material, the second material thereby melting;

allowing the heated area and the layer of second material to cool, thereby bonding the layer of second material to the solenoid tube blank, defining in the solenoid tube blank a bore with an interior surface having a ring of second material disposed between a pair of portions of first material.

19. The method of claim 18, wherein the first material is steel.

20. The method of claim 18, wherein the second material is stainless steel.

* * * * *